April 12, 1932.  E. L. SUTTER  1,853,585
AUTOMOBILE HEATER
Filed July 15, 1929
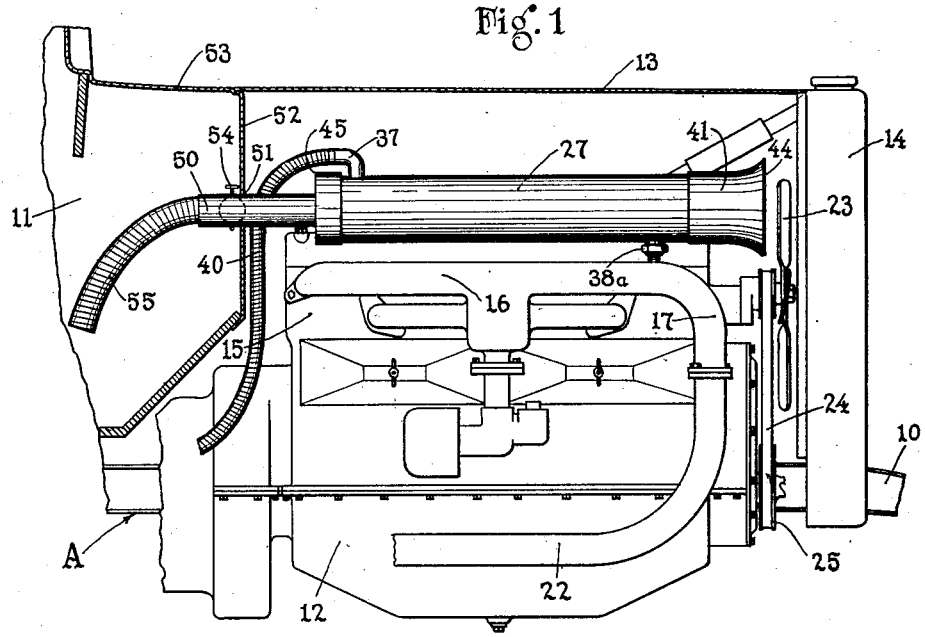
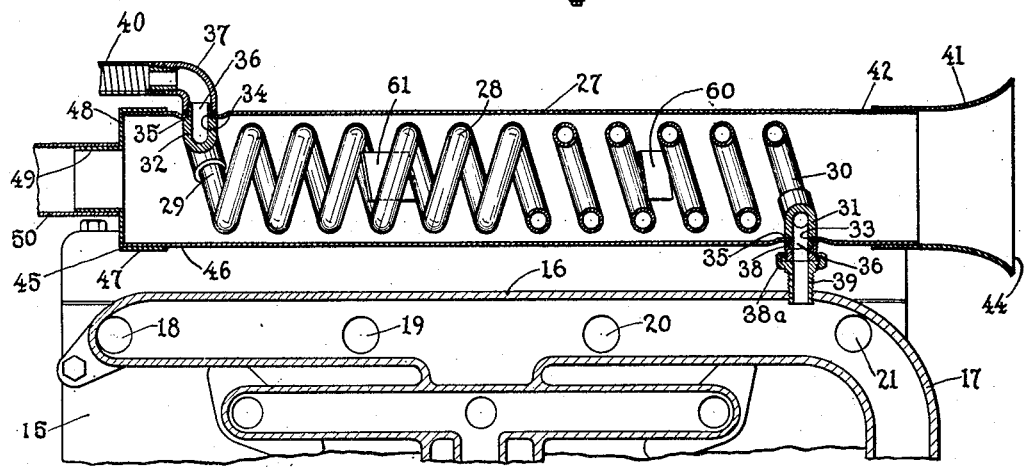
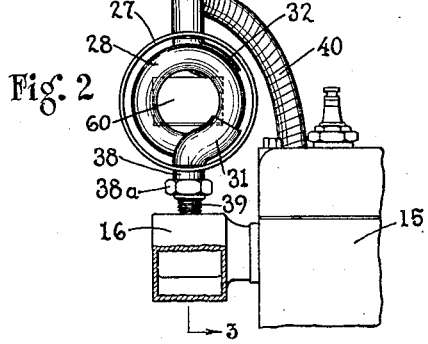
Inventor
Erwin L. Sutter Patented Apr. 12, 1932

1,853,585

UNITED STATES PATENT OFFICE

ERWIN L. SUTTER, OF ST. CLOUD, MINNESOTA, ASSIGNOR, BY MESNE ASSIGNMENTS, TO ALBERT L. RITT, OF ST. PAUL, MINNESOTA

AUTOMOBILE HEATER

Application filed July 15, 1929. Serial No. 378,195.

My invention relates to heaters, and particularly to heaters used in conjunction with motor vehicles.

An object of the invention resides in providing a simple, durable and inexpensive heater which may be readily installed in any of the various models of automobiles in common use.

Another object of the invention resides in providing a heater which is extremely efficient in operation and which will deliver heated air in substantial quantity without the use of incorporated moving parts.

A further object of the invention resides in providing a heater including a case through which air may be impelled into the automobile body and further including a heating coil disposed within said case and connected with the exhaust manifold of the automobile engine for heating said air.

Another object of the invention resides in positioning the heater proper close to the exhaust manifold of the engine and in connecting the receiving end of the coil to the manifold adjacent to the inlet from the exhaust port of the last cylinder in the train, where the pressure of the burning gases and the heat thereof are relatively great.

A feature of the invention resides in supplying a bell for one end of the case and a reducer for the other end thereof, and in further supplying inlet and outlet connections for the coil securing the coil and case together, the bell and reducer being interchangeable to permit of the reversal of the case end-to-end, and the bell having a slidably adjustable mounting on the case to enable the mouth thereof, in the various installations of the case, to face closely the usual fan and/or radiator of the engine cooling system.

A still further object of the invention resides in providing a conduit detachably coupled to the reducer and adapted to extend through the cowl dash of the vehicle and beneath the cowl thereof.

An object of the invention resides in providing in the assembled structure a unitary device adapted to be supported solely through said conduit and the inlet connection.

Another object of the invention resides in providing the discharge end of the conduit with a damper and with a flexible outlet nozzle adapted to be disposed and to remain as desired for the purpose of discharging the heated air at any particular point and in any particular direction.

Other objects of the invention reside in the details of construction thereof, and in the novel combination and arrangement of parts hereinafter illustrated or described.

In the drawings:

Fig. 1 is a side elevational view of a portion of a motor vehicle illustrating an application of my invention thereto; Fig. 2 is an end elevational view of the heater and a portion of the engine to which the same is attached, and Fig. 3 is a longitudinal sectional view of the heater proper and a portion of the engine.

In the usual automobile heater, considerable time is required before sufficient heat is generated to enable the user to receive any benefit therefrom. The present invention overcomes this disadvantage by providing a device in which the heat is quickly generated and in which a sufficient amount of heated air may be circulated through the system to give the user the desired benefits.

For the purpose of illustrating an application of my invention, I have shown a portion of a motor vehicle indicated in its entirety at A. This vehicle includes the usual frame 10, body 11, internal combustion engine 12, hood 13 and radiator 14. The body 11 includes the usual cowl 53 and cowl dash 52. The engine 12 may be of any of the usual multiple cylinder types and may include the usual cylinder block 15 to which is connected an exhaust manifold 16. The manifold illustrated has inlets 18, 19, 20 and 21 which communicate with the exhaust ports of the various cylinders of the engine. The exhaust gases entering the manifold 16 through these various inlets pass through the discharge end 17 of said manifold and are finally expelled through the exhaust pipe 22 connected to the manifold in the usual manner. In advance of the engine is provided the usual cooling fan 23 which is driven through a belt 24 from a fan belt pulley 25. This fan, disposed, as usual, immediately back of the cooling radiator 14, serves to cool the engine and maintain the radiator at the proper temperature. In common automobile constructions exhaust manifolds are disposed both on the left hand side and on the right hand side of the engine and in each of these relative positions of said manifolds connections with the usual exhaust pipes are made both at the front and at the rear of the manifolds. In the automobile construction illustrated, the manifold 16 is shown at the right side of the engine turning downwardly at the front of the vehicle and connected with the exhaust pipe 22 at the forward end of the engine. My device is designed to permit of its application to any of the said different types of construction which may be encountered, as will more fully hereinafter appear.

The heater proper comprises a cylindrical case 27 preferably constructed of sheet metal and open at the two ends thereof. Disposed within this case and spaced slightly from its inner wall is a coil 28 of tubing, the two ends 29 and 30 thereof being secured, as by brazing, to connections 31 and 32 which extend outwardly through openings 33 and 34 in the case near opposite ends of the same and on opposite sides of the case, as shown. The connections 31 and 32 are formed with shoulders 35 which abut against the inner surface of the case 27 and with externally threaded nipples 36 comprising the portions of said connections 31 and 32 which extend outwardly from the case.

In the particular installation shown, an elbow 37 is screwed upon the nipple 36 of connection 32, while the internally threaded neck 38 of a union 38ª is screwed upon the nipple 36 of connection 31. Both of these fittings 37 and 38 abut against the outside of the case 27 and clamp the coil and case together.

Preparatory to installing my heater, the exhaust manifold is tapped at the top thereof at a point adjacent to the last of the inlets in the direction of flow of gases in the manifold. In other words, the manifold is tapped near the exhaust or discharge end thereof, the desideratum being to take off hot gases from the manifold at a point where gases from all or the greater number of the cylinders is available and where the temperature of the gases and the pressure thereof are substantially at the maximum.

In the present disclosure, the manifold 16 is tapped near the inlet 21 to receive the threaded nipple 39 of union 38ª. This threaded nipple 39 of union 38ª is screwed into the tapped portion of the manifold, after which the union is coupled together to hold the heater firmly mounted upon the manifold. In this manner, the heater is connected to the manifold so as to take off gases therefrom at the hottest point and at a location where the pressure of the gases is relatively high. When so positioned, the heater closely superimposes the manifold 16 with the connection 32 disposed at the rearward end of the case 27. For the purpose of conducting away the exhaust gases which pass through the coil 28, I attach a flexible tube 40 to the elbow 37, which tube may be fastened in any suitable manner to any of the various parts of the vehicle and lead to a point beneath the body of the vehicle, where the gases can be discharged into the atmosphere.

As before stated, the case 27 is constructed open at the ends while the coil 28 is spaced from the walls of the said case to provide an air passageway extending along the same on both the interior and exterior thereof. At the forward end of the case 27 is mounted a bell member or extension 41 which, when the heater is properly installed, is disposed with the mouth 44 thereof located immediately back of the fan 23. This bell is slidably mounted along the portion 42 of the case 27 extending outwardly beyond the coil connection 31, and is held in adjusted position along this portion of the case by being snugly fitted and/or by any suitable fastening means such as bolts or the like.

In order to conduct the heated air from the case 27 to the point of discharge, a reducing member 45 is employed, the same being mounted upon the end 46 of the case 27, which end extends rearwardly beyond the connection 32 of the coil 28. This reducer 45 comprises a sleeve portion 47 which fits snugly about the end 46 of said case and is constructed with a flange portion 48 terminating in a nipple 49. The reducer 45 may be attached to the case 27 in the same manner as the bell 41 and may be interchanged with the bell to reverse the positions of bell and reducer upon the ends of the case. The nipple 49 snugly receives one end of a conduit 50 which may be in the nature of a metal tube. This conduit 50 extends rearwardly and passes through a suitable opening 51 in the cowl dash 52 of the body 11 and terminates beneath the cowl 53. Said conduit 50 is provided with a valve 54 by means of which the circulation of air through the heater may be regulated and connects with and supports a flexible tube 55 adapted to be fixed in different positions to discharge the heated air in different directions and at different points within the body of the vehicle as may be desired. To cause the air in passing through the case 27, to follow a tortuous path about the turns of the heating coil 28, two deflectors 60 and 61 are installed within said coil 27. These deflectors may be constructed of sheet metal and attached to turns of the coil in any suitable manner.

In an installation where the fan 23 is a considerable distance from the engine, the end of case 27 is put forwardly which has the longest portion projecting beyond the adjacent coil connection. In the heater illustrated, this would be the end 42, the connection in this case being the connection 31. The bell 41, mounted upon said projecting portion of the case, is adjusted to bring the mouth 44 thereof in near proximity to the fan 23. The reducer 45 is applied to the other end of the case 27, the conduit 50 being inserted through the opening 51 in the cowl dash 52 and slipped over the nipple 49 of the reducer 45. Thus the heater is supported through the conduit 50 and dash 52 and through the supporting union 38$^a$. When necessary, the conduit 50 may be shortened by cutting off a portion thereof so that the valved end of the conduit need not project farther than desired beneath the cowl of the vehicle. In an installation where the fan 23 is fairly close to the engine, the case 27 may be turned end for end and the union 38$^a$ secured to the connection 32. In such event, the shorter protruding end of the case is brought nearest the fan and the bell 41 mounted upon the same. Elbow 37 is then attached to the connection 31 at the other end of the coil and the reducer 45 attached to the end 42 of the case. Where the discharge from the manifold is at the rear of the engine instead of at the front, as illustrated, the manifold is tapped at the rear in the same relative position, and the case 27 inverted with respect to the position shown in Fig. 1. In such event, the union 38$^a$ is attached to the connection 32 and the elbow 37 to the connection 31. In like manner, the heater may be installed upon a manifold disposed on the left hand side of an engine as well as upon a right hand side, making it possible to apply this single device to the engine of any of a large number of the different automobiles in common use.

In the operation of the invention, exhaust gases are forced from the manifold directly into the coil 27, causing the coil to become quickly and thoroughly heated. Air is forced by the fan 23 and/or by reason of the momentum of the vehicle through the case 27 surrounding the close coupled coil and thence through conduit 50 and tube 55 into the interior of the automobile body.

My invention is advantageous in that an extremely simple and efficient device is provided for delivering to the occupants of the motor vehicle appreciable quantities of heated air. The device can be constructed at a nominal cost and is readily susceptible of quantity production. It is of a universal character, in that it can be applied to practically all of the common types of motor vehicles. An entire absence of moving parts prevents the invention from becoming noisy, or being rendered inoperative. By utilizing the air current created by the cooling fan and/or by the movement of the vehicle, a relatively great amount of heated air may be supplied to the interior of the cab. By closely positioning the heater to the exhaust manifold, and by closely coupling the inlet connection of the heating coil to the discharge end of the manifold near the inlet thereto from the last cylinder, no waste of heat or energy from the exhaust gases occurs, thereby causing the device to function in an exceedingly efficient and effective manner. The device can be installed at small expense. The inlet and outlet connections for the heating coil secure the coil and case with respect to each other, the former connection providing the principal mounting for the device, such mounting being supplemented alone by the conduit passing through the cowl dash of the vehicle. The device is universally adapted to the various automobiles in present day use and may be readily installed in any instance without change in the vehicle structure other than tapping the manifold and boring a hole in the cowl dash. In the heater itself, nothing more than the inversion or reversal or adjustment of parts is required. The heater may be readily removed, if desired, and the vehicle placed in its original state with little effort and expense.

Changes in the specific form of my invention, as herein disclosed, may be made within the scope of what is claimed without departing from the spirit of my invention.

Having described my invention, what I claim as new and desire to protect by Letters Patent is:

1. A universal heater attachment for an automobile powered with an internal combustion engine having an exhaust manifold exhausting forwardly or rearwardly and having a cooling fan for blowing air lengthwise of the manifold, said heater comprising an elongated case forming an air passageway and adapted to be disposed adjacent to and coextensive with the exhaust manifold, a conduit within the case for conducting exhaust gases therethrough, a pair of connections, one for each end of said conduit, either thereof being adapted to be coupled with the manifold, said connections issuing from the case in opposite directions, one being farther from its respective end of the case than the other, an air inlet extension and a hot air take-off conduit interchangeably applicable to the ends of said case, said case being adapted to be inverted and reversed end for end to bring one of the connections adjacent to the exhaust end of the manifold and to bring the end portions of the case selectively into position, for the reception of said extension, adjacent to the fan.

2. A heater attachment for an automobile powered with an internal combustion engine having an exhaust manifold and a cooling fan for blowing air lengthwise of the manifold, said heater comprising an elongated case forming a passageway for the reception of air from said fan at one end thereof and adapted to be disposed adjacent to and co-extensive with said engine manifold, a conduit within the case for conducting exhaust gases therethrough, a pair of connections, one for each end of said conduit, either thereof being adapted to be coupled with the manifold, said connections issuing from the case radially in opposite positions, a hot air take-off conduit applied to the other end of the case, said case being adapted to be positioned to bring the particular connection nearest the exhaust end of the manifold adjacent thereto for close coupling with the manifold.

3. In a heater, an elongated case forming a passageway for air, a conduit within said case for conducting exhaust gases therethrough, a connection for coupling one end of said conduit to the exhaust outlet of an internal combustion engine, said connection serving to clamp said case and conduit together and providing a mounting element for the assembly, a conduit for conducting heated air away from said case, and a conduit for conducting exhaust gases away from the other end of said first conduit.

4. In a heater, an elongated case forming a passageway for air, a conduit within said case for conducting exhaust gases therethrough, a connection for coupling one end of said conduit to the exhaust outlet of an internal combustion engine, said connection serving to clamp said case and conduit together and providing a mounting element for the assembly, a second conduit for conducting heated air away from said case, and a third conduit for conducting exhaust gases away from the other end of said first conduit, said second conduit providing a second mounting element for said assembly.

5. A heater for an automobile powered with an internal combustion engine having a fan and an exhaust manifold, said heater comprising a case forming an air passageway, a heating conduit within said passageway for conducting exhaust gases therethrough having terminal connections positioned near the ends of said case, one thereof being adapted to be coupled with the exhaust manifold and one being closer to its respective end of the case than the other, a bell for leading air from the fan into said passageway, a second conduit for conducting heated air from said passageway, said bell and said second conduit being interchangeably detachably mounted on the ends of said case to accord with the particular distance encountered between the fan and the point of connection between said first conduit and manifold.

6. A heater comprising a case forming an air passageway, a heating element within said passageway having terminals issuing from the case near the ends thereof, inlet and outlet attachments secured to said terminals, said attachments being interchangeable, the former providing a mounting for the heater and both serving to secure the case and heating element with respect to each other.

7. A heater comprising a case forming an air passageway, a heating coil within said case, a connection for said coil extending through said case, and an attachment secured to said connection for coupling the heater to an exhaust manifold, said attachment engaging said case and operating in conjunction with said connection to clamp the coil and case together.

8. A heater for an automobile powered with an internal combustion engine having an exhaust manifold, said heater comprising an elongated case adapted to be disposed adjacent to and co-extensive with the engine manifold and forming a passageway for the reception of air at its forward end, a conduit within the case for conducting exhaust gases from one end thereof to the other, a pair of connections, one for each end of said conduit, said connections issuing from the case laterally thereof in different directions and adapted selectively to be close coupled with the manifold, the case being shiftable about its axis to bring one or the other of said connections into close coupling relation with respect to one end or the other of the manifold, a hot air take-off conduit connected with the case at the rear end thereof, and an exhaust gas take-off conduit adapted to be connected with the otherwise unemployed connection.

9. A heater for an automobile powered with an internal combustion engine providing a source of heating fluid, said heater comprising a case forming an air passageway, a heating conduit within said case, a connection for said conduit extending through the case, and an attachment secured to said connection to couple the heater with the engine and bring its source of heating fluid into communication with said conduit, said attachment engaging said case and operating in conjunction with said connection to clamp the conduit and case together.

10. A heater of the character described comprising a case forming an air passageway, a conduit for a heating fluid disposed within the case, a connection for the conduit extending through the case, and means cooperating with said connection relatively to secure said conduit and case.

11. An automobile heater comprising an elongated reversible case open at its ends and providing an air passageway through which air may travel in either direction, a mounting near each end of the case for selective attachment to the automobile engine at selected localities, one mounting being located a greater distance from one end of the case than the other mounting from the other end of the case to cause the case to occupy one position when attached to the engine through one mounting and a relatively different position with respect to the engine when attached through the other mounting, a hot air take-off device interchangeably attachable to either end of the case, and means for heating the air passing through the case.

12. An automobile heater comprising an elongated reversible case open at its ends and providing an air passageway through which air may travel in either direction, a mounting near each end of the case for selective attachment to the automobile engine at selected localities, one mounting being located a greater distance from one end of the case than the other mounting from the other end of the case to cause the case to occupy one position when attached to the engine through one mounting and a relatively different position with respect to the engine when attached through the other mounting, a hot air take-off device interchangeably attachable to either end of the case, and means for heating the air passing through the case, said means comprising a conduit within the case for a heating fluid, one of said mountings serving to admit the fluid to the conduit at one end thereof and the other of said mountings serving to conduct the said heating fluid from said conduit.

13. An automobile heater comprising an elongated reversible case open at its ends and providing an air passageway through which air may travel in either direction, a mounting near each end of the case for selective attachment to the automobile engine at selected localities, one mounting being located a greater distance from one end of the case than the other mounting from the other end of the case to cause the case to occupy one position when attached to the engine through one mounting and a relatively different position with respect to the engine when attached through the other mounting, a hot air take-off device interchangeably attachable to either end of the case, and means for heating the air passing through the case, said means comprising a conduit within the case for a heating fluid, one of said mountings serving to admit the fluid to the conduit at one end thereof and the other of said mountings serving to conduct the said heating fluid from said conduit, said mountings being located on angularly related radii of the case.

In testimony whereof I have affixed my signature to this specification.

ERWIN L. SUTTER.